Sept. 6, 1932.  W. A. RUKEYSER  1,875,890
METHOD FOR TREATING ASBESTOS
Filed July 3, 1930  2 Sheets-Sheet 1
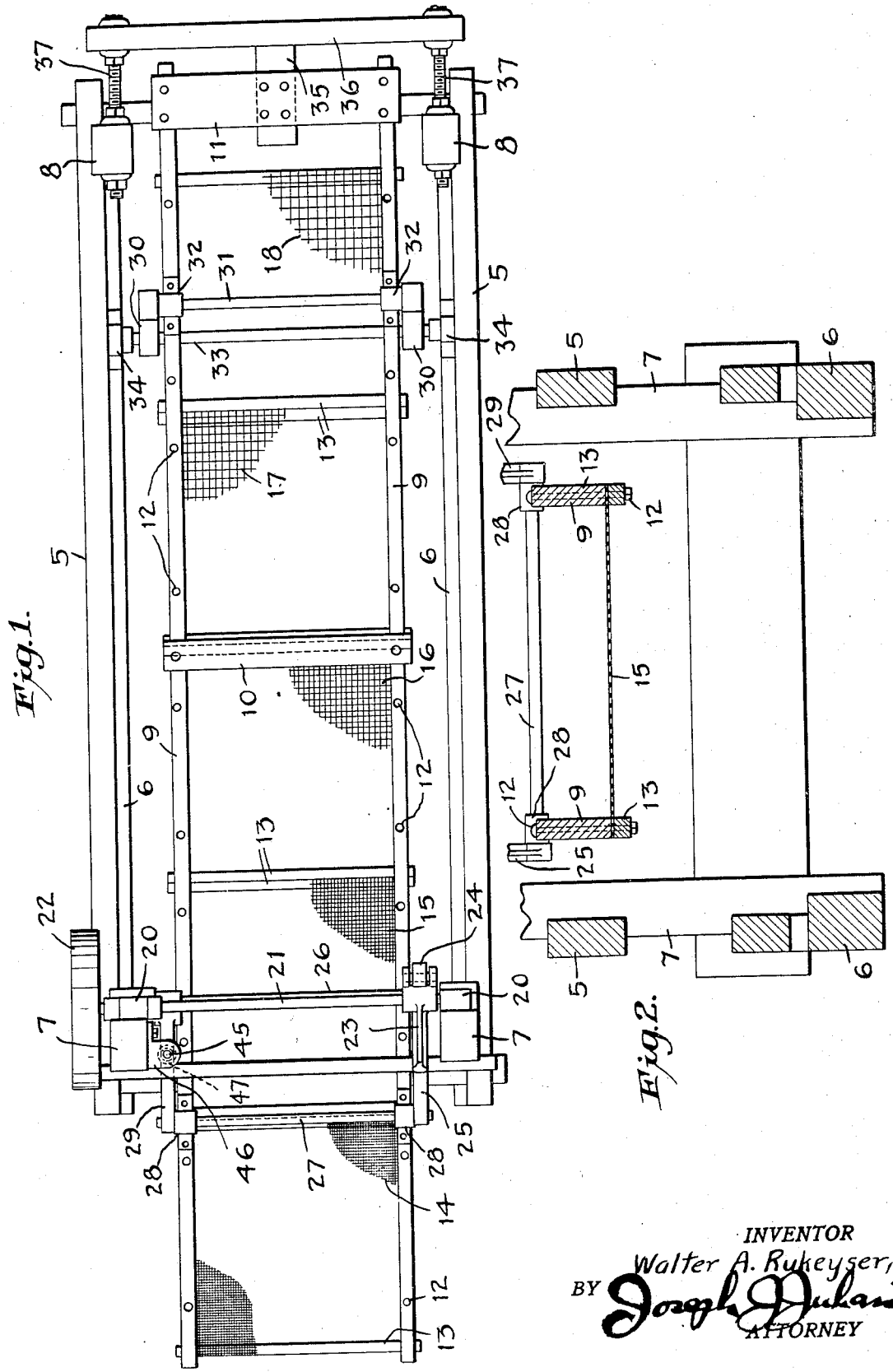
INVENTOR
Walter A. Rukeyser,
BY
ATTORNEY Sept. 6, 1932.  W. A. RUKEYSER  1,875,890
METHOD FOR TREATING ASBESTOS
Filed July 3, 1930   2 Sheets-Sheet 2
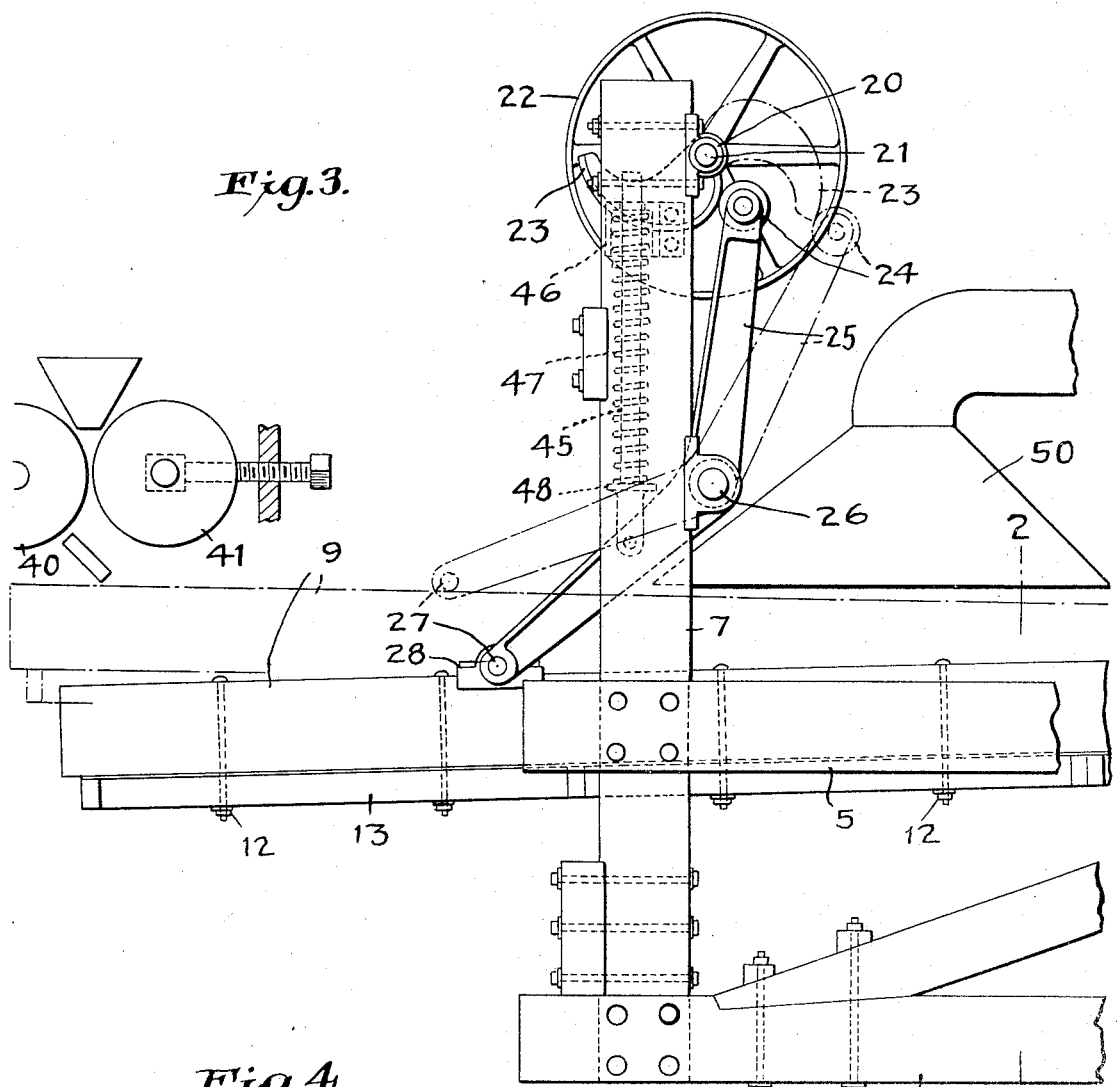
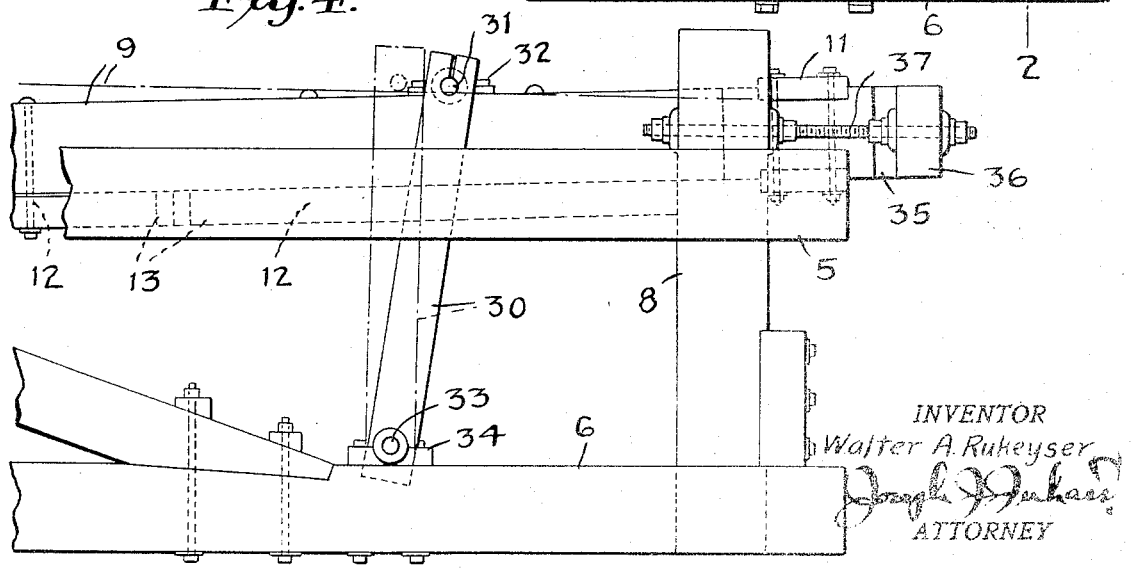
INVENTOR
Walter A. Rukeyser
ATTORNEY Patented Sept. 6, 1932

1,875,890

UNITED STATES PATENT OFFICE

WALTER ARNOLD RUKEYSER, OF GLOBE, ARIZONA

METHOD FOR TREATING ASBESTOS

Application filed July 3, 1930. Serial No. 465,485.

The invention relates to a method for treating asbestos and has for its particular object to provide a method whereby the crude asbestos may be cleanly separated from the rock particles adhering to it and at the same time maintain the crude asbestos in the masslike form most suitable for use in the asbestos manufacturing industry.

The main purpose of the invention is to provide a method of simultaneously and/or successively grading and cleaning from the gangue asbestos fibers from crushed asbestos ore.

Another object of the invention is provision of a differential movement to a support of the asbestos thereon, whereby the movement or shake is regulated to transport the asbestos along the surface of the said support and to retain the fibers in plane positions parallel to the support.

Asbestos veins of the cross-fibre type having a width of ½" or greater yield is what is generally termed in the asbestor industry, "crude" asbestos. The width of the veins vary and the product is commonly called No. 1 "crude", No. 2 "crude", or "run-of-mine crude", depending upon the width of the vein.

To the best of applicant's knowledge up to the present time crude asbestos has always been extracted from the rock enclosing it, by entirely hand methods. The rock is first blasted in the mine and the large pieces of asbestos ore enclosing veins of crude asbestos, are sledged or bull-dozed by further blasting until the fragments are small enough to be cobbed by hand. The crude asbestos with the rock adhering is then hand-sorted, and cleaned by further cobbing.

It has never been feasible to put rock containing crude asbestos through the normal milling practices, which have been in vogue for a great many years, and which utilize the fibrous nature of asbestos for its separation by fiberization and air suction, the reason being that manufacturers of asbestos products who buy crude asbestos from the mine, prefer the asbestos in an unfiberized state. In other words, the rodlike bundles of asbestos fibre are preferred "unopened" and unfiberized for their purposes of manufacture. One of the principal objects of the present invention is to provide a method for obtaining the asbestos in such unopened, unfiberized form.

A further reason which has prevented the application of usual milling practices to crude asbestos is the tremendous attrition in the various stages of crushing the rock. The attrition to the fibre results in a considerable breakage and therefore a large loss in value, as the crude unbroken asbestos has a much higher market value than the "milled" products.

Numerous other objects and advantages of the invention will become apparent as this specification proceeds. Referring to the drawings forming a part thereof and in which one form of the invention is illustrated:

Figure 1 is a top plan view;

Figure 2 is a cross-sectional view taken on line 2—2 of Figure 1;

Figure 3 is a fragmentary side elevation of the end of the machine receiving the crude asbestos from the crushing rolls; and Figure 4 is a fragmentary side elevation of the opposite end of the machine.

Referring again to the drawings, the main frame comprises upper longitudinal members 5, lower longitudinal members 6, and uprights 7—7 and 8—8. Suitable cross members and side frame braces may be employed.

Mounted between the longitudinal side members of the main frame is a screen carrier formed of a pair of longitudinal side members 9, connected together by cross members 10 and 11. Secured to the lower side of the screen carrier by bolts 12 are the screen frames 13. It will be noted that the screen 14 on the end of the machine adjacent the posts 7 is a firm mesh. The mesh of the successive screens 15, 16, 17 and 18 increase in size for purposes hereafter described.

The screen carrier and screens in the full line position of Figures 3 and 4 slope toward the receiving end of the machine. Thus the surface of the screen is normally inclined against the direction of flow. Means are provided for raising the end of the screen adjacent the posts 7 and moving the screen carrier and screens rearwardly. After the rearward movement has been completed, a forward movement takes place and it is important that this forward movement be stopped suddenly. The position indicated in broken lines in Figures 3 and 4 shows the screen carrier at the end of its rearward movement and just prior to the beginning of its forward movement.

The means for moving the screen carrier will now be described. Mounted in bearings 20 on the upper ends of the uprights 7 is a shaft 21. The shaft 21 carries a pulley 22 which is adapted to be driven from any suitable source of power. The shaft 21 also has secured to it a horn cam 23, which engages a cam roller 24 carried by one arm of a bell crank lever 25. The bell crank lever 25 is mounted on a cross-shaft 26 carried by suitable bearings mounted on the uprights 7. The lower arm of the bell crank lever 25 is pivoted on a shaft 27 carried by bearings 28 secured to the screen carrier. Another arm 29 is secured to shaft 26 and pivoted to cross shaft 27 carried by the screen carrier. It will then be apparent as the shaft 21 is rotated the screen carrier will be given the desired movement.

The forward part of the screen carrier is pivotally mounted on a pair of hanger bars 30. The upper ends of these hanger bars are pivoted to a cross shaft 31 mounted in bearings 32 carried by the screen carrier and the lower ends of the hanger bars are pivoted on a cross shaft 33, mounted in bearings 34 carried by the stationary frame.

The connecting member 11 of the screen carrier has a block 35 secured to it. This block 35 cooperates with the bumper bar 36 supported by adjustable studs 37 carried by the uprights 8.

A pair of crushing rolls are designated by the reference numerals 40–41. The rolls may be mounted in any suitable manner and if desirable more than one pair may be utilized.

A screen is thus provided in which the head motion is different from known types of asbestos screens on the market today. The horizontal movement of the screen surface is not accomplished in the usual manner through an eccentric movement, but is brought about by the action of the horn cam 23 operated through the system of levers heretofore described.

The fact that the surface of the screen is inclined against the direction flow, coupled with the fact that its forward motion is stopped suddenly by the impact of block 35 against the bumper bar 36, gives the rock its flow along the screen surface entirely by an inertia effect, which is thought to be a novel feature in an asbestos screen. Means are provided for accelerating the forward movement of the screen. This means might be widely varied and as illustrated comprises a rod 45 pivoted to the lower arm of the bell crank lever 25. This rod passes through an aperture in a bracket 46 secured to one of the uprights 7. A powerful spring 47 is confined between the bracket 46 and a flange or collar 48 on the rod 45. As the bell crank lever 25 is moved to the broken line position of Figure 3, this spring is compressed. When the cam roller 24 moves off the horn cam 23, the energy stored up in the spring 47 will aid the force of gravity in bringing the screen carrier to its forward position.

The screen depends for its efficacy upon the operation of the crushing rolls 40–41, as in this crushing operation the rock adhering to the crude asbestos will break into sand due to the inherent friability of the rock masses. The asbestos, on the other hand, having a high tensile strength and not being friable, does not splinter or break into small pieces, that is pieces having the characteristics of sand. The asbestos will become somewhat flattened and in some cases partially fiberized, but it will still maintain its mass-like characteristics.

Furthermore, since there is a distinct line of cleavage due to the inherent nature of asbestos deposits and due to the origin of asbestos veins in the serpentine and other rocks enclosing same, there is always a distinct line of weakness along the rock fractures when the vein is broken away from the adhering waste rock. It is this breaking away of the adhering particles of waste rock which has been accomplished to date by hammering the asbestos with the enclosing rock, with hand hammers until all the rock is pulverized that is broken away from the veins of asbestos and the veins of asbestos are flattened out.

This process of hand cleaning has had to be repeated until the asbestos was entirely cleaned from any adhering rock particles. In the ordinary type of screens existing on the market today, with horizontal screen surfaces and not utilizing an inertia flow of the rock upheld with sharp impact at the end of each stroke, the asbestos is upended and will fall through a smaller screen opening than that governed by the longest dimension of the asbestos fibre. In other words, the asbestos can be likened to a match whose width is extremely small compared to its length. Should this match be upended as is the case in the ordinary type of screen, it would fall through an opening much smaller than that which would be controlled by its longest dimension, namely, its length.

In the screen of the present invention, due to the fact that the asbestos after crushing flows up along the screen to the discharge end, and due to the fact that the flow is brought about by an inertia principle, that is, by what is commonly called "momentum", the asbestos always lies flat on the screen surface, if it is vibrated at all, that is, if it does leave the screen surface when it falls again upon the screen cloth, it has not been upended but still lies flat. It can thus only fall through a screen opening adapted to its longest dimension and since the grading of asbestos into No. 1, No. 2, and No. 3 "crude" is controlled by the longest dimension, a separation of these products is made possible on the asbestos grading screen during the operation of screening.

The crude asbestos not only must be graded and separated according to its length but it must be cleaned of all adhering rock particles. The rock being friable is crushed by the rolls 40, 41, into particles of such small diameter that they will pass through the fine mesh 14 of the first screen.

The valuable asbestos, being longer, will travel over the screen cloth of smallest opening and will pass up along the table until the asbestos finds openings large enough for each grade to fall through, the waste rock particles and dirt having been eliminated by the first sections of screen cloth. The fact that the table is not only moving horizontally but also in a vertical direction, both motions involving an impact at the end of the stroke, a thorough mixing of the materials is at all times accomplished and a high cleaning capacity is given to the screen surface.

In accordance with present practice in the asbestos industry, the ore is fed in at the high end of an inclined screen and the material flows along downward the screen surface. In addition the ordinary shaking screen table used in the industry have only two functions, first to remove the dust, and secondly to create a stratification of the already liberated asbestos fibre, so as to make the fibre amendable to the air suction hoods located at the discharge end of the screens. This type of screen makes no attempt to grade the product nor does it produce a finished product such as is accomplished by the screen of the present invention. It is of high r. p. m.— its reciprocating motion resulting from an eccentric.

If desired, the ordinary type of air suction hood may be used in conjunction with the screen of the present invention so as to take care of any fiberized asbestos that may be liberated. This hood is indicated at 50 in Figure 3. In this manner, the capacity of the grading screen is increased. Also, if air suction is provided, not only is fiberized material removed but a better cleaning and grading action results on the remaining crudes.

It will be understood that the rock or ore is primarily crushed in either standard type jaw-crushers or gyratories, etc. before passing between the rolls 40–41. If desired, more than one set of crushing rolls may be employed; but rolls are an integral part of the process.

Changes may be made in details of construction and arrangements of parts without departing from the spirit of the invention or the scope of the appended claims.

I claim:

1. The process of cleaning asbestos fiber from the gangue and grading the same comprising placing a mass of crushed asbestos-bearing rock and/or asbestos upon a flat support having cleaning and grading passages and imparting to the support and the said asbestos thereon a differential shake having horizontal and vertical components regulated to transport the said asbestos along the surface and to retain the fibers in position parallel to the support.

2. The process of cleaning asbestos fiber from the gangue and grading the same comprising placing crushed asbestos-bearing rock and/or asbestos upon a flat and normally upwardly inclined support having cleaning and grading passages and imparting to the support and the said asbestos thereon a series of like differential shakes having horizontal and vertical components regulated to transport the said asbestos along the surface and against the angle of inclination thereof and to retain the fibers in position parallel to the support.

3. The process of cleaning asbestos fiber from the gangue and grading the same comprising placing a mass of crushed asbestos-bearing rock and/or asbestos upon a flat support having cleaning and grading passages and imparting to the support and the said asbestos thereon a differential shake having horizontal and vertical components regulated to transport the said asbestos along the surface by inertia and to retain the fibers substantially in plane positions parallel to the support.

4. The process of cleaning asbestos fiber from the gangue and grading the same comprising placing a mass of crushed asbestos-bearing rock and/or asbestos upon a flat and normally upwardly inclined support having cleaning and grading passages and imparting to the support and the said asbestos thereon a differential shake having horizontal and vertical components regulated to transport the said asbestos along the surface and against the angle of inclination thereof and to retain the fibers substantially in plane positions parallel to the support.

Signed at New York city in the county of New York and State of New York this 7th day of June A. D. 1930.

WALTER ARNOLD RUKEYSER.